Aug. 28, 1928.
V. ANGERER
1,681,969
HYDRAULIC CENTER SHIFTING MECHANISM
Filed Dec. 15, 1919    2 Sheets-Sheet 1
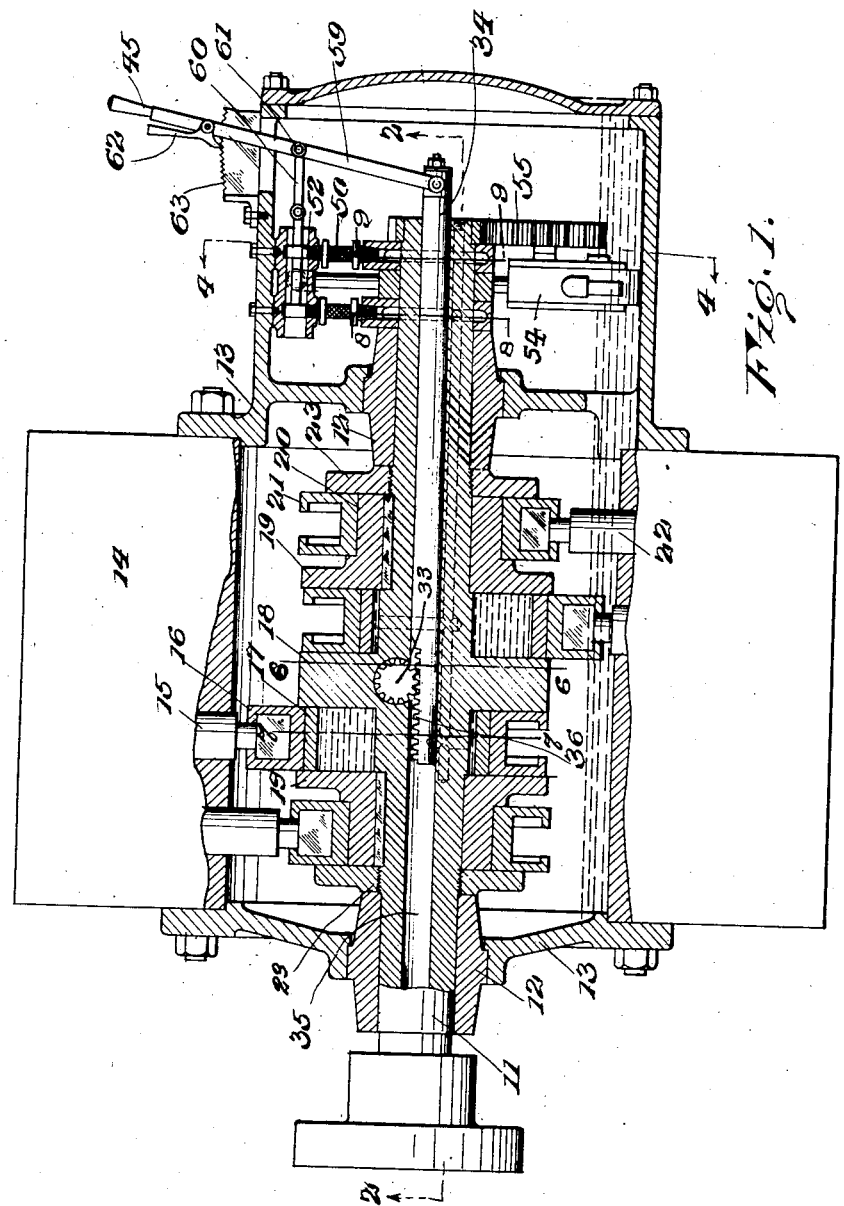
INVENTOR
*Victor Angerer*
BY
*Jack B. Richmond*
ATTORNEY Aug. 28, 1928.
V. ANGERER
1,681,969
HYDRAULIC CENTER SHIFTING MECHANISM
Filed Dec. 15, 1919    2 Sheets-Sheet 2
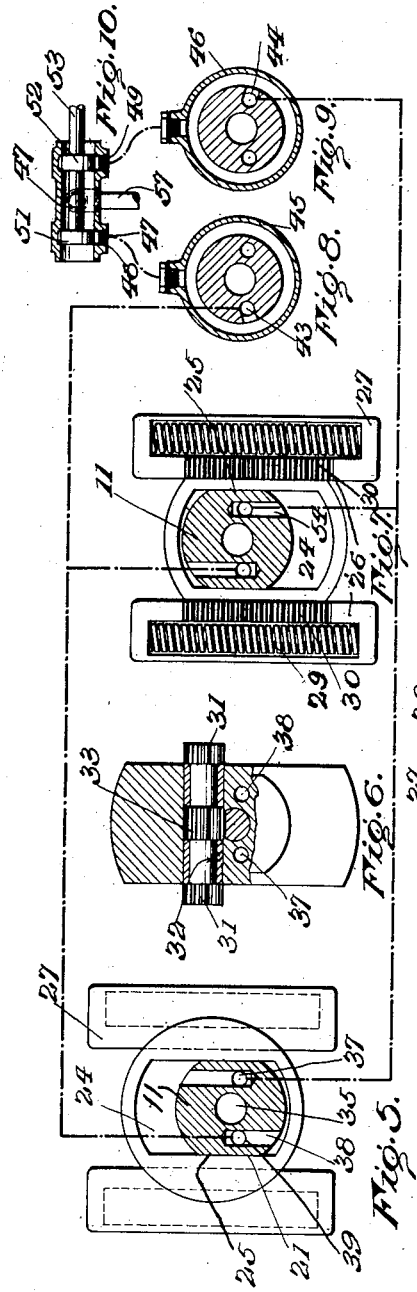
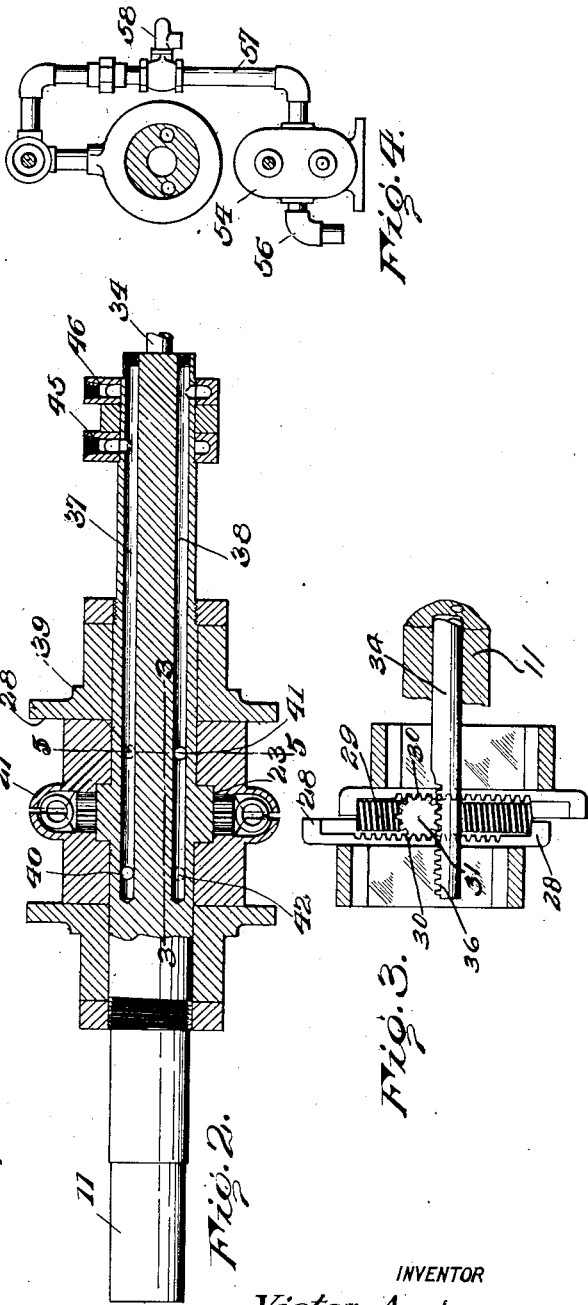
INVENTOR
*Victor Angerer.*
BY
*Jack A. Richmond*
ATTORNEY Patented Aug. 28, 1928.

1,681,969

UNITED STATES PATENT OFFICE.

VICTOR ANGERER, OF RIDLEY PARK, PENNSYLVANIA, ASSIGNOR TO TAYLOR-WHARTON IRON AND STEEL COMPANY, OF HIGH BRIDGE, NEW JERSEY, A CORPORATION OF NEW JERSEY.

HYDRAULIC CENTER-SHIFTING MECHANISM.

Application filed December 15, 1919. Serial No. 344,959.

This invention relates to hydraulic adjusting means for eccentrics and like power elements, wherein such elements may be set for any power variation, from zero to maximum, and maintained in such set position automatically.

The invention provides a means for setting the control of the hydraulic adjusting means for a predetermined movement of the power elements, such power elements in their movement acting to mechanically govern the fluid-pressure control to limit the movement of the power elements to the predetermined positions. This mechanical control of the fluid pressure is responsive to any movement of the power elements, and hence affords an automatic compensation for leakage losses in the adjusting fluid.

The invention contemplates the application of the fluid pressure directly to the power element to be adjusted, and preferably to the interior of such element, to thereby cause the pressure fluid to act at all times as the direct and sole means for maintaining the power element in its adjusted position. This insures a simple and direct adjustment, the power resistance of which is practically efficient and immediately responsive to control adjustments.

In the drawings:—

Fig. 1 is a longitudinal sectional view, partly in elevation, showing the improved hydraulic adjusting means applied to a pump operated through balanced shiftable eccentrics.

Fig. 2 is a section on line 2—2 of Fig. 1.
Fig. 3 is a section on line 3—3 of Fig. 2.
Fig. 4 is a section on line 4—4 of Fig. 1.
Fig. 5 is a section on line 5—5 of Fig. 2, the eccentric being shown in elevation.
Fig. 6 is a section partly in elevation on line 6—6 of Fig. 1.
Fig. 7 is a section on line 7—7 of Fig. 1.
Fig. 8 is a section on line 8—8 of Fig. 1.
Fig. 9 is a section on line 9—9 of Fig. 1.
Fig. 10 is a section view of the pilot valve, the fluid movement as controlled by such valve being indicated by dotted line connections between said Fig. 10 and Figs. 5, 7, 8, and 9.

The invention is here shown as applied to an eccentric-operated pump, and while the details of the following description will be limited to such application, it is apparent that the invention is equally applicable to the control of other power elements designed for power variation through their adjustment.

The pump illustrated includes a power shaft 11, mounted in bearings 12, supported in a hollow base or body 13, to which body is secured the pump casing 14. The plungers 15 operating in the pump casing are actuated by ring members 16 bearing upon and operated by eccentrics 17.

The shaft 11 is formed intermediate the eccentrics 17 with a rectangular enlargement or collar 18, and the eccentrics are arranged on opposite sides of this enlargement. Beyond the eccentrics 17, relative to the enlargement, there is keyed or otherwise secured on the shaft 11 eccentric plates 19, each having a wall next the eccentric corresponding in dimensions to the maximum dimension of the enlargement 18. The plates 19 are formed to provide eccentrics 20, having ring members 21 for actuating valve members 22. End plates 23 are shown as threaded upon the shaft 11, immediately beyond the plates 19, to thereby maintain the assembly, while permitting the ready separation of the parts when necessary.

The eccentrics are mounted for movement on shaft 11, through interior openings 24, hereinafter termed fluid chambers, which in dimensions in one direction exceed that of the shaft, to permit desired movement of such eccentrics. The eccentrics are maintained in sliding relation to the shaft, but held against other independent movement relative thereto, by providing the shaft with opposed flattened portions 25, and forming the corresponding walls of the eccentric chambers 24 for a fluid tight engagement with such flattened portions. The ends of the chambers 24 longitudinally of the shaft are closed by the shaft enlargement 18 and by the walls of the plates 19. The eccentrics are thus formed with fluid chambers which are closed except for communication with the fluid ducts to be hereinafter referred to.

The eccentrics are also provided with means for balancing the centrifugal force thereof said means consisting in the provision on each eccentric, at right angles to the shaft 11 of extensions 26. The extensions on the respective eccentrics are disposed in parallelism to the flattened portions 25 of the shaft 11, the extensions of one eccentric projecting toward the extensions of the other eccentric. The extensions bear upon those walls of the shaft enlargement defining the minor dimension of such enlargement, and such extensions are further provided with rounded outstanding housings 27, each having terminal inwardly extending lips 28. The arrangement of the housings 27 of both eccentrics provide for the reception, on opposite sides of the shaft, of a coil spring 29, held, as shown, in the adjacent housings of separate eccentrics and terminally engaged by the lips 28. The springs 29 are preferably positioned under slight initial compression, so that in any movement of the eccentrics the springs will be compressed and tensioned in proportion to such movement, to thereby offset or balance the centrifugal force. Inwardly of the housings, the respective extensions 26 are formed with gear racks 30, the opposed racks cooperating with pinions 31, on a shaft 32 rotatively mounted in and transversely to the shaft 11, the shaft 32 being centrally formed with a pinion 33. A control rod 34 is slidably arranged in a central bore 35 of the shaft 11, and is provided with a gear rack 36 at all times in mesh with the pinion 33. The movement of the eccentrics will therefore be transmitted to the control shaft 34, which movement is utilized for the automatic regulation to be later referred to.

The shaft 11 is formed with longitudinally extending fluid ducts or channels 37 and 38, which channels communicate with the chambers 24 of the eccentrics, or more exactly with the respective divisions of each chamber 24 formed by the shaft 11. That is to say, channel 37 has an open port 39 leading to one chamber division of one eccentric and a port 40 leading to the relatively opposite chamber division of the other eccentric. The channel 38 has similar ports 41 and 42 communicating with the remaining and respective chamber divisions of the eccentrics. Therefore, each fluid channel communicates with each eccentric, but with opposed chamber divisions thereof. This permits either channel to be used as a fluid pressure channel, while the remaining channel serves as an exhaust channel, the particular fluid channel simultaneously delivering fluid under pressure to both eccentrics, but in opposite chamber divisions thereof, so that the eccentrics are simultaneously moved in opposite directions with the same pressure.

The end of the shaft 11, opposite the power end thereof, is formed with ports 43, 44, communicating with the respective channels 37 and 38, and opening through the surface of the shaft into hollow distributing rings 45 and 46, arranged to encircle the shaft and fixed against rotation in any appropriate manner. Arranged above the distributors 45 and 46 is a pilot valve including a casing 47, open at the ends to the interior of the body 13, and having ports 48, 49, in pipe communication, as at 50, with the respective distributors 45, 46. Valves 51, 52 in the pilot valve casing, control the ports 48, 49, and are connected to a valve rod 53, so as to similarly govern such ports, that is simultaneously open or close them. The body 13 serves as a fluid reservoir for the hydraulic adjusting means, and the pressure of the fluid is secured through a pump 54, driven through gears 55 from the shaft 11, and having its intake 56 open to the fluid in the reservoir. The pump outlet 57 leads into the pilot valve casing between the ports 48 and 49, said pump connection having a spring loaded outlet 58, to by-pass the fluid from the pump back into the reservoir when the pilot valve is in neutral or closed position.

The pilot valve is initially operated through a hand lever 59, having its lower end rotatively fulcrumed on the end of rod 34, the pilot valve rod 53 being connected to the lever 59 at 61 intermediate the ends of the latter, by means of the link 60. The upper end of the lever 59 is provided with a latch 62 adapted to cooperate with a notched segment 63, whereby the lever may be moved to open the pilot valve to the predetermined degree, and temporarily locked in such adjustment by the latch 62.

With the lever 59 moved a predetermined degree, for example toward the left in Fig. 1, and locked in such position, the fulcrum of the lever is the point of the latch 62, and the pilot valves will be moved toward the left. This movement of the valves opens the port 48 to the pump, while the port 49 is opened to the reservoir through the end of the casing 47. Fluid channel 37 of shaft 11 then becomes a pressure channel and 38 an exhaust channel. Fluid is forced into the proper chamber divisions of the chambers 24 of the eccentrics, and these eccentrics are moved in an obvious manner to vary their eccentricity to the shaft. In this movement of the eccentrics, the control rod 34 is correspondingly moved, through operation of the pinion shaft 32, and as the rod 34 is moved longitudinally of the shaft 11, the fulcrum of lever 59 is of course correspondingly moved. As the hand lever 59 is locked to the segment 63, such point now becomes the fulcrum of the lever 59, and the shifting of rod 34 operates the lever 59 on the new fulcrum to return the pilot valves to a neutral or closed position. This cuts off the pressure fluid to the eccentrics, and they are held in their then adjusted positions. With a knowledge of the lever movement necessary to insure a predetermined adjustment of the eccentrics, it is apparent that the mere movement of the lever to such position will result in an adjustment of the eccentrics and the automatically-governed cut-off or control of the pressure fluid.

In the event of leakage from the eccentric chambers, the resultant movement of the eccentrics will correspondingly shift the rod 34 to thereby open the pilot valve in the proper direction and admit additional pressure fluid to restore the eccentrics to the pre-adjusted positions, thus compensating automatically for leakage.

The hydraulic center-shift shown and described utilizes the power shaft as the means for generating the pressure of the operating fluid, through actuating the pressure pump, so that beyond setting the hand lever for the desired adjustment, the control is entirely automatic.

Having thus described the invention, what is claimed as new, is:—

1. A shaft, eccentrics mounted thereon for adjustment, each eccentric fluid being formed with a chamber divided by the shaft, fluid channels extending longitudinally of the shaft and communicating with alternate chamber divisions of the eccentrics, a pilot valve for controlling the admission of fluid to the channels, means for manually operating the valve, and means movable lengthwise and within the shaft and responsive to manual adjustment of the valve for automatically operating the valve in opposition to the manual operation following a predetermined adjustment of the eccentrics under the pressure fluid.

2. A shaft, eccentrics mounted thereon for adjustment, each eccentric being formed with a chamber divided by the shaft, fluid channels extending longitudinally of the shaft and communicating with alternate chamber divisions of the eccentrics, a pilot valve for controlling the admission of fluid to the channels, a manually operated means for opening the valve, and means movable lengthwise and within the shaft and operated by the movement of the eccentrics for automatically closing the valve.

3. A shaft, eccentrics mounted thereon for adjustment and each formed with a chamber divided by the shaft, fluid channels extending longitudinally of the shaft and communicating with the respective chamber divisions of the eccentrics, a pilot valve for controlling the admission of pressure fluid to the channels, means for opening said valve, a rod movable lengthwise the shaft, a connection between the rod and pilot valve, and means operated in the adjustment of the eccentrics for actuating said rod.

4. A shaft, eccentrics mounted thereon for adjustment and each formed with a chamber divided by the shaft, fluid channels extending longitudinally of the shaft and communicating with the alternate chamber-divisions of the eccentrics, a pilot valve controlling said channels, a lever for operating said valve, a rod movable in a bore of the shaft, a connection between said rod and pilot valve, and means actuated by adjusting movement of the eccentrics to operate said rod.

5. A shaft, eccentrics mounted for adjustment thereon, each of said eccentrics being formed with a chamber divided by the shaft, and means for delivering a pressure fluid simultaneously to opposed chamber-divisions of the eccentrics, said means including a pilot valve, a lever for operating said valve, a rod movable in the shaft and shifted longitudinally by the adjustment of the eccentrics, said lever being mounted on said rod, and means to fix one end of the lever following the valve operation thereby to provide a fulcrum for the lever under rod operation thereof.

6. A shaft, eccentrics having chambered openings mounted on the shaft to divide such chambers by the shaft, means on the shaft for closing the chambers beyond the shaft, housings on the eccentrics opening toward and adjacent each other, and a spring mounted in the adjacent housings of the respective eccentrics, said spring being tensioned in the opposite movement of the eccentrics.

In testimony whereof I affix my signature.

VICTOR ANGERER.